United States Patent [19]

Lindmayer

[11] 4,298,423

[45] Nov. 3, 1981

[54] METHOD OF PURIFYING SILICON

[75] Inventor: Joseph Lindmayer, Bethesda, Md.

[73] Assignee: Semix Incorporated, Gaithersburg, Md.

[21] Appl. No.: 112,213

[22] Filed: Jan. 15, 1980

Related U.S. Application Data

[63] Continuation-in-part of Ser. No. 751,343, Dec. 16, 1976, abandoned.

[51] Int. Cl.$^3$ .............................................. C01B 33/02
[52] U.S. Cl. ................................. 156/616 R; 136/261; 156/DIG. 64; 156/DIG. 66; 156/DIG. 89; 423/348
[58] Field of Search ........................ 423/348; 23/294; 156/DIG. 64, DIG. 89, 616 R, DIG. 66; 136/261, 258

[56] References Cited

U.S. PATENT DOCUMENTS 3,008,887  11/1961  Herglotz .............................. 423/348

FOREIGN PATENT DOCUMENTS 2639563  3/1978  Fed. Rep. of Germany ...... 423/348
787394  12/1957  United Kingdom ................ 423/348

*Primary Examiner*—Jack Cooper
*Attorney, Agent, or Firm*—Watson, Cole, Grindle & Watson

[57] ABSTRACT

A method of purifying silicon, in which the silicon is heated to a molten state, contacted with a gas inert to silicon to remove impurities, and thereafter cooled to a solid state.

9 Claims, No Drawings

METHOD OF PURIFYING SILICON

This application is a continuation in part of application Ser. No. 751,343, filed Dec. 16, 1976, now abandoned.

The present invention generally relates to a method of purifying silicon, and more specifically refers to a method wherein silicon of a grade that is not considered suitable for use as semiconductor material can be purified. More specifically, when this purification process is utilized, the silicon so produced is adapted for use as the host material for silicon solar energy cells.

Historically, solar cells have employed a so-called single crystal or semiconductor grade silicon for use in producing silicon in solar energy cells. Yet the cost of such crystalline silicon in ingot form is present about $300/kg. By contrast, what is referred to as metallurgical grade silicon, which is made by the reduction of $SiO_2$, is relatively inexpensive; its cost may be as low as $0.30/kg. Since approximately 30 percent of the material cost of silicon solar energy cells is attributable to the cost of the silicon, it will be apparent that the cost of photovoltaic cells could be abruptly reduced where it is possible to utilize metallurgical grade silicon at least as a starting material to be purified and thereafter used as the base for photovoltaic cells.

Single crystal silicon contains impurities measured in less than parts per million. Metallurgical grade silicon is of a purity less than 99.5%, i.e., the impurities in metallurgical grade silicon exceed 0.5%. These differences in purity, as well as differences in crystal structure, have thus far made metallurgical grade and other low-purity silicon unsuitable for use as the host material for solar cells; other than my own use of semicrystalline silicon, single crystal silicon has been the only form of silicon successfully used for photovoltaic cells. Until the present time, much effort of industry and government has been directed toward new methods for producing single crystal silicon. The present invention, on the contrary, begins with a low-purity silicon and has for its purpose the removal of some impurities from that silicon, thereby to achieve silicon of an acceptable level of impurities for use in photovoltaic cells, although not technically of semiconductor grade.

The present invention is founded on the discovery that subjecting silicon to non-oxidizing gases while the silicon is in a molten state can substantially reduce the impurities in the silicon. Further, casting of the silicon into the form of crystallites or grains tends to concentrate impurities in the grain boundaries.

While impurities in metallurgical grade silicon vary according to the method and apparatus utilized to make that silicon, typical impurities in such silicon are listed in the table hereinbelow, in which the percent of impurities was determined by emission spectroscopy.

| Typical Impurities in Metallurgical Silicon | |
|---|---|
| Impurity | % |
| Fe | 0.5 |
| Al | 0.3 |
| Cr | 0.04 |
| Ti | 0.03 |
| Mn, V | 0.02 |
| Mg, Ni | 0.01 |
| Hg, Sb | <0.02 |
| As, Ba, Ca, Cd, P | <0.05 |
| Au, Mo, Zn, Zr | <0.005 |
| B, Pb, Sn | <0.002 |
| Ag, Be, Bi | <0.001 |

I have now found that heating impure silicon to a molten state and thereafter passing a gas or mixture of gases across or about the surface of the silicon reduces the impurities in the silicon. Of necessity, the gases are inert to the silicon. For example, an oxidizing atmosphere, such as one containing substantial amounts of water vapor, would convert silicon into silicon dioxide, to the detriment of the ultimate product. Removal of impurities is accomplished by contacting the surface of the molten silicon with a gas or mixture of gases that are inert to the silicon, and then removing those gases from the immediate region of the silicon surface, e.g., by exhausting the gases or by drawing a partial vacuum in the chamber in which the silicon has been heated to a molten state.

As has been stated, the impure silicon that is to be heated to the molten state is that which, broadly, has a purity less than single crystal silicon: less than 99.5%. Most logically, since metallurgical grade silicon is readily available at the present time because of its wide use in the steel industry, that grade of silicon, which is 99.5% pure or less, is most economically adapted for use as a starting material. By way of example, impurities in the impure silicon may be present in about 0.5 to 2 percent by weight; more specifically, the impure silicon may have between 1 and 2 percent by weight of metallic impurities. It will be apparent, however, that silicon of lesser degrees of purity will also be well adapted to the present method of purification, depending on the economic advantages attendant upon such use. Thus, silicon that is 98% pure, or even of a lesser degree of purity, depending upon the specific impurities present, may well be suitable for treatment by the present process.

The key to the present process is economy. It is founded on my discovery that, whereas exceptionally pure forms of silicon are required for many semiconductor uses, and have therefore given rise to the term, semiconductor grade silicon, that grade is not necessary for the achievement of a practical use of silicon as the host material for solar cells. That is not to say that the most pure forms of monocrystalline silicon are not useful as such host material; it is to emphasize that the increased efficiencies obtained by the use of exceptionally pure or semiconductor grade silicon, here understood to be silicon having less than 2000 ppm impurities, as such host material are simply not commensurate with the greatly increased costs of achieving such degrees of purity.

As a contrast, the procedure known as zone refining may be considered the diametrical opposite of the process toward which the present invention is directed. As defined in the *Kirk-Othmer, Encyclopedia of Chemical Technology*, 2d edition, volume 22, pp. 680 et seq., "Zone refining is a modification of the classical purification technique of fractional crystallization. To effect purification, fractional crystallization utilizes the difference in solubility of a solute in the solid and liquid phases of the solvent." By contrast, in the present invention no such technique is utilized; the treatment is accomplished solely by sweeping a gas or mixture of gases across the surface of the impure silicon, which is entirely in a liquid phase, except for such metallic impurities that may float to the surface of the silicon and be in the form of a slag thereon. As further stated on page 680 of the Encyclopedia, ". . . zone refining is a costly operation in terms of both time and money." Thus, in zone refining zoning speeds can actually fall in a range of 0.25 to 6 inches per hour. All this results in ultrahigh purity, semiconductor grade silicon, which may be necessary where studies of electronic structure, magnetoresistance, fluorescence and other phenomena are to be conducted, and for the transistor industry. Such ultrahigh degrees of purity are not contemplated within the scope of the present invention; neither, of course, are extremely slow and costly purification techniques contemplated, it having been determined that by a relatively rapid skimming off of impurities, particularly metallic impurities, a good photovoltaic grade of silicon can be achieved.

It has also previously been known that bubbling wet hydrogen through silicon will effect removal of boron from the molten silicon. Any such procedure is likewise to be considered without the scope of the present invention, since the application of water vapor, here in the form of steam, will detract from the purity of the silicon for its intended purpose in photovoltaic cells and, in my experience, will cause oxidation of silicon, which is an occurrence that is definitely not desired. Further, where boron is to be a dopant for silicon that is to be used as a host material for photovoltaic cells, the presence of some boron in the silicon will not at all be adverse, although the presence of silicon dioxide is decidedly disadvantageous. As a consequence, the gas that is to form the atmosphere to be brought into contact with the surface of the molten silicon should be substantially free of water vapor. In particular, whatever quantity of water vapor is present, which will be absolutely minimal, will be insufficient to remove any significant quantity of boron from the molten silicon.

The container in which the silicon is to be heated to a molten state must be inert to the molten silicon at the highest temperature to which the silicon is to be heated. Typically, the container will be a crucible formed from graphite or a refractory composition. Moreover, it is recognized that the material from which the container is formed may play some part in the removal of impurities from the molten silicon. Thus, graphite probably has some gettering effect on impurities and further work will be directed toward increasing that effect by using other compositions to form the container, which compositions may have a gettering effect in excess of that of graphite.

The temperature to which the silicon is to be heated will be in excess of about 1410° C., the melting point of silicon. Naturally, such melting point will be affected to a relatively minor extent by the types and quantities of impurities in the impure silicon being treated. It is, in any case, necessary that the silicon be molten, i.e., flowable, and it has been found that such temperatures are preferably between 1410° C. and about 1490° C. This temperature range is such as to cause elimination of a large portion of the impurities in the metallurgical grade silicon as purchased. It will be apparent that there will be a variety of temperatures within the preferred range, and that where a particular impurity is to be removed, the optimum temperature may even be higher if it is determined that such increased temperature will ameliorate removal. The range just recited, however, has been found advantageous and, most specifically a temperature of about 1430° C. has been most efficient both with respect to energy requirements and removal of impurities from metallurgical grade silicon.

The heating of the solid silicon to the molten state is accomplished in a non-oxidizing atmosphere. In particular, the surrounding gases are inert to the silicon, i.e., they will not readily react with the silicon at the temperatures employed. Among such gases that have been utilized are hydrogen, nitrogen, argon and helium, although it is apparent that other gases such as neon will also be suitable for use, although it may also be possible to use a reactive gas, such as hydrochloric acid, to remove impurities without reacting with the silicon. In order to bring such gases, or a mixture of those gases, into contact with the surface of the molten silicon, a positive flow of gas may be utilized, the gas being obtained from pressure cylinders outside the chamber in which the silicon is heated. Further, a fan blade mounted in the ceiling of the chamber may be employed to exhaust spent gas from the chamber, or a partial vacuum could be maintained for that purpose. Although it is not necessarily economically requisite, it is possible to pass the gas through a device that will remove the impurities carried by the gas, than recycle the purified gas back to the heating chamber. In any case, it is preferable that there be a continuous flow of gas inert to silicon over the surface of the molten silicon to provide continuous removal of impurities that rise to the surface of the silicon.

The surface of the silicon is contacted with the inert gaseous atmosphere for a desired period of time, e.g., from 10 seconds to 30 minutes, depending on the velocity with which contact with fresh gas is accomplished, the degree and type of impurities to be removed, and other factors. Then contact ceases, the chamber vented if desired, and the silicon cooled below its melting point in such a manner as will minimize or eliminate the occurrence of disruptions in the continuum of the cast silicon. Such mode of cooling is more fully described and is claimed in my copending application Ser. No. 751,342 filed on Dec. 16, 1976 and now abandoned in favor of copending application Ser. No. 959,982, filed Nov. 13, 1978, now U.S. Pat. No. 4,256,681. After the silicon has been cooled to ambient conditions, it is separated from the crucible and thereafter used as the base material for silicon solar energy cells. Depending upon such use, it has been found preferable to dope the silicon during casting with a dopant, such as boron, so that on subsequent diffusion of an opposite conductivity type impurity, a p-n junction can be formed in the cooled, silicon wafer.

In a preferred embodiment of my invention, metallurgical grade silicon having a purity of less than about 99.5% was placed in a graphite crucible together with an appropriate quantity of elemental boron, which crucible was then placed in a quartz tube surrounded by radio frequency heating coils. The tube, crucible and coils were located within a protective chamber, with controls operable from outside the chamber. By suitable connections a flow of gas comprising a mixture of hydrogen and argon in approximately equal proportions was initiated. The gases flowed from their respective cyclinders into one end of the quartz tube, then to, around and past the crucible. Then, over a period of about 15 minutes the silicon in the crucible was heated by radio frequency waves to a temperature of about 1450° C., at which temperature the silicon was entirely molten. Impurities appeared to be floating on the surface of the molten silicon in the form of scum at this temperature, which was determined roughly by use of an optical pyrometer. The flow of gas was maintained about the surface of the molten silicon, for about 15 minutes, at the end of which time it was observed that there was a substantial decrease in what appeared to be impurities that had risen to the surface of the molten silicon. Gas was continuously withdrawn from the heating chamber by means of an exhaust fan located in the roof of the chamber.

After the flow of gas to remove impurities had been completed, the molten silicon in the crucible was permitted to cool, preferably in the manner described in my aforesaid copending application. The flow of gas was continued during cooling to maintain a non-oxidizing atmosphere around the silicon. The solidified silicon was separated from the crucible and the ingot so produced was found to have a higher degree of purity than the silicon prior to having been subjected to the purification process. Moreover, the crystallographic structure of the silicon was semicrystalline and such impurities as remained were largely concentrated at the grain boundaries. After further treatment, including etching and diffusion with a diffusant such as phosphorus, a silicon solar energy cell could be made using the purified, metallurgical grade silicon, which, to the best of the applicant's knowledge, represents a substantial step forward in this art.

It will be apparent that certain modifications and alterations in the description of my inventive method set forth hereinbefore will be obvious to those of skill in the art. Exemplarily, other inert gases and various mixtures thereof can be used, and different modes of bringing those gases into contact with the molten silicon may be employed, where feasible. It is desired that this patent grant protection as to all such modifications and alterations, and that the scope of my invention be defined only by the recitations, and equivalents thereof, of the following, appended claims.

I claim:

1. A method of treating silicon having a percentage of impurities therein of at least 0.5%, thereby economically improving the purity thereof so that the resulting silicon will be of photovoltaic grade but less than semiconductor grade purity, comprising
    (a) placing a charge of impure silicon having at least 0.5% impurities in a container that remains inert at a temperature at which silicon is in a freely molten state,
    (b) heating said impure silicon in said container to a temperature at which all of said charge has melted and there is no liquid-solid interface between melted and unmelted silicon and impurities rise to the surface of the silicon, but not to a temperature at which the inert container will substantially react with the silicon,
    (c) providing a non-oxidizing gaseous atmosphere at the surface of the molten silicon, said atmosphere being substantially free of water vapor and any other gas with which the silicon will react,
    (d) causing a flow of said gaseous atmosphere over the surface of the molten silicon so that impurities at the surface of the molten silicon are carried away from said surface by said atmosphere, and
    (e) thereafter cooling said silicon from its molten state to a temperature below its solidification point to form a solid silicon having a degree of purity greater than 99.5% but less than semiconductor grade silicon and suitable for use as a host material in photovoltaic cells.

2. A method of treating silicon as claimed in claim 1, in which said impurities in said impure silicon are metallic impurities.

3. A method of treating silicon as claimed in claim 2, in which said impurities in said impure silicon are present in about 0.5 to 2 percent by weight.

4. A method of treating silicon as claimed in claim 1, in which said impure silicon has between 1 and 2 percent metallic impurities.

5. A method of treating silicon as claimed in claim 1, in which said non-oxidizing gaseous atmosphere is selected from the group consisting of hydrogen, nitrogen, argon, helium, neon and mixtures thereof.

6. A method of treating silicon as claimed in claim 1, in which said gaseous atmosphere is hydrogen.

7. A method of treating silicon as claimed in claim 1, in which the flow of said gaseous atmosphere is maintained under positive pressure past the surface of the molten silicon.

8. A method of treating silicon as claimed in claim 1, in which said inert container is formed from graphite.

9. A method of treating silicon as claimed in claim 1, in which the inert container is formed from a ceramic material.

* * * * *